Patented Sept. 28, 1948

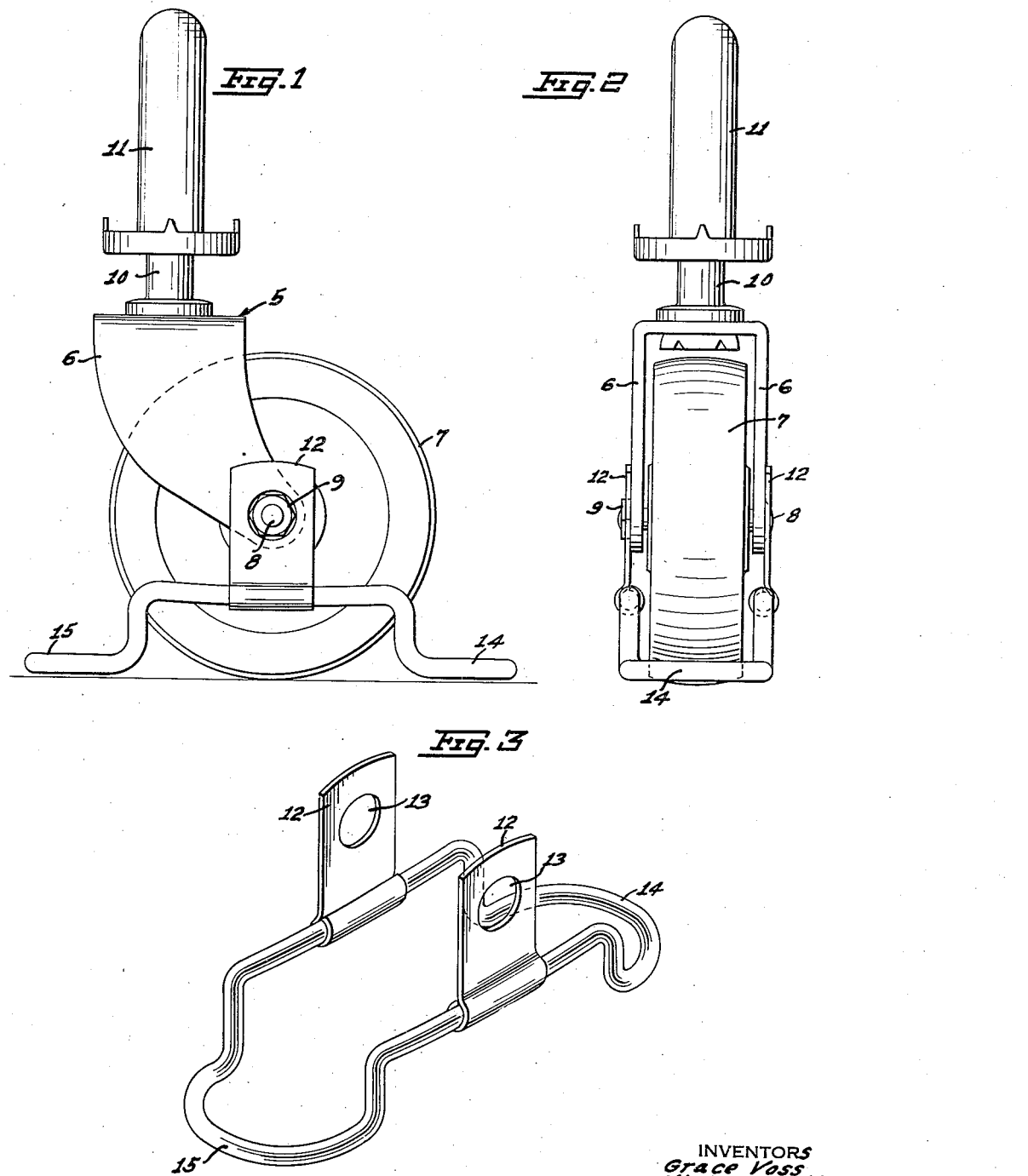

2,450,062

UNITED STATES PATENT OFFICE 2,450,062

CASTER GUARD

Grace Voss, New York, N. Y., and Victor G. Ellis, Montclair, N. J.

Application June 17, 1946, Serial No. 677,356

7 Claims. (Cl. 16—18)

This invention relates to improvements in casters and particularly to a caster attachment adapted to prevent entangling of or injury to electrical conductors and the like which may rest on the floor over which the caster is moved.

In photographic studios, laboratories, factories, as well as in homes, various kinds of equipment and apparatus are movable on casters. For example, cameras employed by commercial photographers are usually mounted on tripods having casters. In homes, vacuum cleaners are provided with casters. Often electrical conductors are used to supply current to the movable equipment or to auxiliary apparatus such as illuminating devices. It is a common experience that such conductors on the floor often interfere with the movement of casters or may even become entangled in or injured by the casters.

It is the object of the present invention to provide a simple and inexpensive caster attachment which, when assembled therewith, will engage and move an electrical conductor or the like along the floor in such a manner as to prevent interference with the caster or entanglement of or injury to the conductor.

Other objects and advantages of the invention will be apparent as it is better understood by reference to the following specification and the accompanying drawing, in which Fig. 1 is a side elevation of the device assembled with a caster;

Fig. 2 is a front elevation of the structure shown in Fig. 1; and

Fig. 3 is a view in perspective of the caster guard.

The invention comprises a caster having a guard associated therewith so that it substantially surrounds the wheel of the caster with its lower edge in a plane only slightly above the floor level, so that the wheel can roll freely while the guard engages and pushes aside an obstruction such as an electrical conductor resting on the floor. The guard may be embodied in various forms. It is constructed preferably so that it may be supported concentrically with the wheel bearing shaft of the caster, so that it turns with the caster when the latter moves on its vertical spindle. Thus, apparatus supported on a plurality of casters in the usual manner can be moved freely about the floor without danger that the wheels of the casters will engage or entangle electrical conductors and the like on the floor.

Referring to the drawing, 5 indicates a caster frame of the usual type, having wings 6 and a wheel 7 supported on an axle 8 extending through the wings 6 and secured by a nut 9. The caster has a vertical spindle 10 extending into a spindle housing 11 which may be secured to the apparatus which is mounted on the caster. Thus, the caster may turn upon the vertical axis of the spindle in the usual manner.

The guard comprises a pair of ears 12 having openings 13 therein of sufficient size to snap over the head of the axle 8 and over the nut 9 so as to be freely suspended thereon. Connected to the ears 12 are U-shaped members 14 and 15, preferably of substantially circular cross-section, which extend around the wheel 7. The outer ends of the U-shaped members 14 and 15 are dropped so that their lower edges are spaced from the plane tangent to the periphery of the wheel 7 only sufficiently to clear the floor over which the wheel may roll. The guard formed by the members 14 and 15 surrounds the wheel and will engage and push aside any object such as an electrical conductor on the floor. Thus, equipment provided with a plurality of casters with guards as described may be moved about a floor over which one or more electrical conductors are disposed without injury to the conductors.

The invention thus facilitates the handling of apparatus such as movable cameras, vacuum cleaners and the like. It avoids the difficulties heretofore experienced with obstructions such as electrical conductors on the floor interfering with the free movement of equipment supported on casters.

Various changes may be made in the details of construction as described without departing from the invention or sacrificing the advantages thereof.

We claim:

1. In a device as described, a caster frame, an axle, a wheel supported therein and a guard, consisting of U-shaped members supported on the axle and surrounding the wheel, with its lower edge spaced only slightly above the plane tangent to the periphery of the wheel.

2. In a device as described, a caster frame, an axle and a guard consisting of U-shaped members supported on the axle surrounding the wheel, with its lower edge spaced only slightly above the plane tangent to the periphery of the wheel.

3. In a device as described, a caster frame, an axle extending through the frame, a wheel mounted on the axle and a guard, supported on the axle and consisting of U-shaped members surrounding the wheel, with its lower edge spaced only slightly above the plane tangent to the periphery of the wheel.

4. In a device as described, a caster frame, an axle, a vertical spindle on the frame, a wheel supported therein and a guard, consisting of U-shaped members supported on the axle and surrounding the wheel, with its lower edge spaced only slightly above the plane tangent to the periphery of the wheel.

5. In a device as described, spaced ears having openings therein and U-shaped members oppositely disposed and connected to the ears substantially in perpendicular relation thereto.

6. In a device as described, spaced ears having openings therein and U-shaped members of generally circular cross-section oppositely disposed and connected to the ears, substantially in perpendicular relation thereto.

7. In a device as described, U-shaped members forming together a continuous band and ears having openings therein projecting on opposite sides of the band in substantially perpendicular relation thereto.

GRACE VOSS.
VICTOR G. ELLIS.

REFERENCES CITED

The following references are of record in the file of this patent:

UNITED STATES PATENTS

| Number | Name | Date |
|---|---|---|
| 550,239 | Allen | Nov. 26, 1895 |
| 672,138 | Stockwell | Apr. 16, 1901 |
| 1,348,584 | Rosenfield | Aug. 3, 1920 |
| 2,046,384 | Katcher | July 7, 1936 |